United States Patent

[11] 3,611,822

[72] Inventor Martin I. Sanderson
 132 Grove St., Salinas, Calif. 93901
[21] Appl. No. 863,420
[22] Filed Sept. 29, 1969
[45] Patented Oct. 12, 1971

[54] BELT-TIGHTENING MECHANISM
 10 Claims, 3 Drawing Figs.
[52] U.S. Cl. .................................................. 74/242.9,
  74/413
[51] Int. Cl. .................................................. F16h 7/08,
  F16h 1/06
[50] Field of Search .......................................... 74/413,
  242.9

[56] References Cited
 UNITED STATES PATENTS
 644,954  3/1900  Wales ........................... 74/413
 658,896  10/1900  Hirst ............................ 74/413
 1,764,767  6/1930  Wilhelm ........................ 74/242.9
 1,902,980  3/1933  Wilhelm ........................ 74/242.9
 2,396,860  3/1946  Lee ............................. 74/242.9
 2,753,724  4/1956  Leyer et al. .................... 74/242.9

Primary Examiner—Leonard H. Gerin
Attorney—Joseph B. Gardner

ABSTRACT: Mechanism for automatically adjusting the tension in a drivebelt in accordance with changes in the magnitude of the required power transmission therealong. The mechanism includes a pulley wheel adapted to have an endless belt entrained thereabout, and the wheel is annular so as to provide an open interior about which are located a plurality of angularly spaced rollers defining the teeth of an internal ring gear meshingly engaged by a spur gear mounted upon a power shaft. The pulley wheel is rotatably supported by a plurality of support segments located within the interior of the wheel in rolling engagement with the rollers. The segments are connected with hanger structure located along the exterior of the pulley wheel and carried by the drive shaft for angular displacements relative thereto. Whenever the requirement for increased power transmission along the belt occurs, the hanger structure, support segments, and drive pulley swing angularly about the axis of rotation of the shaft in a direction to increase the tension in the belt, and vice versa.

PATENTED OCT 12 1971

3,611,822

INVENTOR:
MARTIN I. SANDERSON
BY: *Joseph B. Gardner*
ATTORNEY

BELT-TIGHTENING MECHANISM

This invention relates to mechanism for automatically adjusting the tension of a drivebelt in accordance with changes to the contemporary requirement for power transmission therethrough, and it relates more particularly to automatic belt-tensioning mechanism.

The desirability has long been known of changing the tension of a drivebelt, whether a metal chain or a fibrous band with or without teeth, in accordance with changes in the applied load so that the tension of the belt at any time is as low as reasonably possible to meet the requirement for power transmission therethrough. In this respect, it may be noted that the greater the tension in a belt the more rapidly it fatigues and the more wear it causes in the components about which it is entrained and especially the bearings associated therewith since belt tension usually imparts lateral forces to such bearings which accelerate nonsymmetrical wearing thereof and of the shafts journaled therein. However, as the applied load or a device belt is increased, a greater tension is required thereby in order to prevent belt slippage. Many devices have been proposed heretofore for changing or adjusting belt tension in accordance with the requirement for power transmission therealong, and broadly summarizing such mechanisms, they ordinarily include a pulley wheel (which may be a sprocket for example, if the drivebelt is a chain), structure supporting the pulley wheel for rotation about a nonstationary center or axis, a shaft defining a spatially fixed axis of rotation, a gear pinned to the shaft so as to prevent relative rotation therebetween, and some means for drivingly interconnecting the gear and pulley wheel so that one drives the other.

In operation of such mechanisms, the center of rotation of the pulley wheel shifts about the axis of the shaft to different angular positions in accordance with the magnitude of the load applied to the belt at any particular time. In this respect as the load increases, the center of rotation of the pulley wheel shifts in a direction that increases the tension of tautness of the belt, and vice versa. Such mechanisms have not been totally satisfactory and have many disadvantages including in some cases mechanical complexity, in other cases unreliability, and in still other cases an inability to perform the adjustment function with an acceptable degree of refinement.

An object, among others, of the present invention is to provide an improved mechanism for automatically adjusting the tension in a drivebelt so as to increase the tension when the requirement for power transmission therethrough is increased and vice versa. Another object of the invention is in the provision of improved belt-tensioning mechanism of the character described that is structurally and mechanically simplified, is easy to assemble and disassemble for repair and maintenance should this be required, is positive in its operation, affords a high degree of regulatory control over the tension applied thereby to a drivebelt, and is versatile so as to have utility in a great number of environments.

Very generally, the improved mechanism includes an annular pulley wheel equipped internally with a plurality of angularly spaced rollers each of which is rotatably supported by the pulley wheel. The rollers provide a dual function of serving as teeth meshingly engaged by a gear coactive with the pulley wheel and which gear at least in certain instances imparts rotational motion thereto; and of serving as roller bearings rotatably supporting the pulley wheel upon support structure located within the open interior thereof. The support structure is suspended by hanger structure from the gear-equipped power shaft for pivotal displacements relative thereto. Thus, the mechanism tends to be suspended from the power shaft much in the manner of a pendulum so as to swing angularly with respect thereto in a direction increasing the tension of a drivebelt when the load applied thereto increases, and vice versa.

An embodiment of the invention is illustrated in the accompanying drawing in which.

Figure 1:
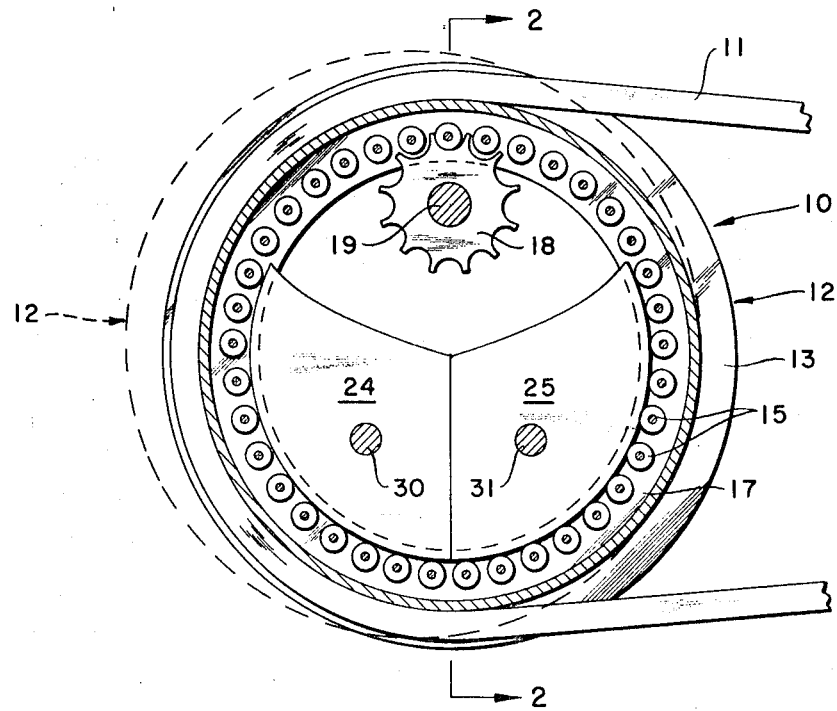
FIG. 1 is essentially a longitudinal sectional view through tension-adjusting mechanism embodying the invention.

The tension-adjusting mechanism illustrated in the drawing is denoted in its entirety with the numeral 10, and it is operative to adjust automatically the tension in a pulley belt 11 in accordance with the contemporary requirement for power transmission therethrough. That is to say, the belt 11 is endless and is entrained at opposite ends thereof about pulley wheels, and the function of the belt is to transmit power between such pulley wheels (i.e., from one to the other). It will be appreciated that the magnitude of the power required to be transmitted by the endless belt 11 at any particular time is dependent upon the load imposed upon the driven pulley wheel, and such required power will be transmitted by the belt assuming that the power being delivered to the drive pulley is adequate to meet the load demand. As explained hereinbefore, it is desirable to maintain the tension in the belt 11 as small as possible for any given load because it will result in the life of the belt being increased and wear on the bearing structures and other components of the power transmitting system being minimized. However, should the load upon the driven pulley wheel be increased suddenly, then there is a tendency for the belt 11 to slip unless the tension thereof can be increased in correspondence with the increase in the applied load.

Figure 3:
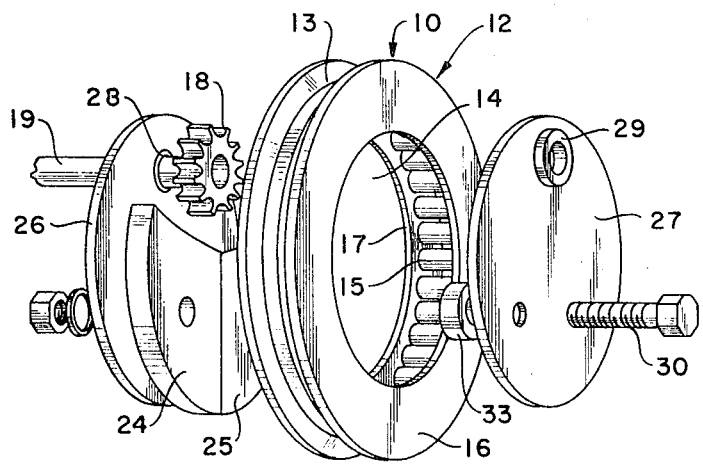
FIG. 3 is an exploded perspective view on reduced scale showing the components of the mechanism in spaced apart relation.

The mechanism 10 includes an annular pulley wheel 12 having a generally V-shaped groove 13 formed along the periphery thereof and within which the belt 11 is entrained. Since the pulley wheel 12 is an annulus, it has a large central opening 14 within the interior thereof as is most evident in FIG. 3. Located generally within such opening, and more particularly in bordering relation therewith, are a plurality of angularly spaced rollers 15 that define the teeth of an internal ring gear. Therefore, the rollers 15 are equally spaced and they extend between the transversely separated sidewalls 16 and 17 of the pulley wheel 12 and are rotatably supported thereby.

Figure 2:
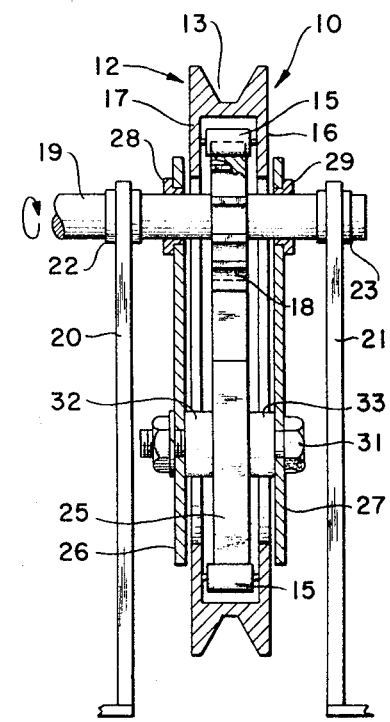
FIG. 2 is a transverse sectional view taken along the line 2—2 of FIG. 1.

In meshing engagement with the ring gear defined by the rollers 15 is a spur gear 18 that is mounted upon a power shaft 19 and is pinned or otherwise secured thereto so as to prevent relative rotation therebetween. Evidently, the shaft 19 is transversely disposed with respect to the pulley wheel 12 and projects thereinto so that the gear 18 is located within the open interior of the drive wheel. As is shown best in FIG. 2, the shaft 19 may extend completely through the pulley wheel 12 and is journaled for rotation in a plurality of uprights or standards 20 and 21 that may form a part of, or be secured to, a suitable base or platform (not shown) upon which the mechanism 10 is mounted. It will be appreciated that the requirements for standards or supports 20 and 21 and the particular location thereof will depend upon any particular environment or installation, and in this respect, in many instances one support will be adequate to carry the shaft 19. In the mechanism shown, the shaft 19 is journaled for rotation in the supports 20 and 21, by bearings 22 and 23, respectively.

Disposed within the open interior 14 of the pulley wheel 12 is support structure that in the particular mechanism being considered takes the form of a plurality of support segments 24 and 25 which are arcuate and together define a substantial segment of a circle having the same diameter as the inner diameter of the ring gear defined by the rollers 15 and its center at the center of rotation of the pulley wheel 12. As will be explained in greater detail hereinafter, the segments 24 and 25 are effectively unified or integrated, and the purpose of providing a plurality of segments is to facilitate insertion thereof into the open interior 14 of the drive pulley. That is to say, the support structure comprising the segments 24 and 25 rotatably supports the pulley wheel 12, and it will be apparent that the greater the angular extent of the support structure, the better will be the support provided thereby for the pulley wheel. Thus, the number of segments used to constitute the support structure can vary considerably, and it should be observed that angular length of the support structure can also be increased or decreased as desired, and in the form shown it has an angular extent somewhat in excess of 180°.

The support structure comprising the segments 24 and 25 is connected with hanger structure by means of which the segments are carried for angular displacements relative to the axis of rotation of the shaft 19. In the particular mechanism shown, the hanger structure is located exteriorly of the pulley wheel and is suspended from the shaft 19 so as to swing freely with respect thereto. Such hanger structure includes a pair of transversely spaced plates 26 and 27 that are generally circular and somewhat larger than the opening 14 within the pulley wheel 12 so as to substantially close such opening along each side thereof, as is most evident in FIG. 2. The hanger plates 26 and 27 are respectively equipped with bearings 28 and 29 through which the shaft 19 extends and which bearings provide a journal enabling the hanger plates to depend from and swing freely with respect to the shaft for angular displacements about the axis of rotation thereof.

The support structure comprising the segments 24 and 25 is connected with the hanger structure comprising the plates 26 and 27 by means of fasteners which may take the form of nut-equipped bolts that extend through openings provided therefore in the plastics and in the segments. In the mechanism illustrated in the drawing, two such fasteners generally denoted with the numerals 30 and 31 are provided in respective association with the segments 24 and 25. A firm substantially rigid interconnection between the segments 24 and 25 and plates 26 and 27 is desired and, therefore, a plurality of spacers 32 and 33 are disposed along the opposite sides of the segments along the respective inner faces of the plates 26 and 27 so as to occupy, and thereby accommodate, the transverse distance between each plate (which is located exteriorly of the pulley wheel) and each segment (which is located interiorly thereof).

In use of the tension-adjusting mechanism 10, it is assembled as shown in the drawing and it is arranged with another pulley wheel (not illustrated) between which power is to be transmitted by the endless belt 11 which, therefore, is entrained about each of the pulley wheels. Taking the case in which the power shaft 19 is an input shaft having torque delivered thereto by a prime mover (not shown) such as an electric motor, the shaft 19 will rotate in a clockwise direction as viewed in FIG. 1. Therefore, the gear 18 will be rotated in the same direction whereupon the pulley wheel 12 will similarly rotate in a clockwise direction thereby moving the belt 11 from right to left along the lower extent thereof and from left to right along its upper reach. Assuming that the magnitude of the load being applied to the driven pulley wheel (not shown) is such that the power required to be transmitted by the belt 11 is adequately maintained when the tension within the belt corresponds to the full-line position of the pulley wheel 12 shown in FIG. 1, then for any other load value the tension within the belt 11 should be increased or decreased in accordance with whether the magnitude of such load increases or decreases.

Should the contemporary value of the load be increased, the belt 11 will not move as freely because the requirements for power transmission therealong are increased and a net resistive force will be applied to the belt along the lower reach thereof tending to impede its movement from right to left therealong. Accordingly, if the likelihood of slippage between the belt 11 and drive pulley 12 is to be avoided, the tension of the belt must be increased and such increase is accomplished automatically with the mechanism 10 by angular displacement of the pulley wheel 12 in a clockwise direction, as seen in FIG. 1, about the axis or rotation of the shaft 19 toward the dotted line position illustrated in this figure.

Such clockwise angular displacement of the pulley wheel 12 (and the center or axis of rotation thereof) relative to the shaft 19 will occur because the belt will have a negative acceleration (i.e. deceleration) momentarily applied thereto by the increased load imposed thereon; and if the driving torque applied to the shaft 19 is sufficiently great it will continue to rotate at the same velocity, whereupon the action of the gear 18 will tend to lift or swing the pulley wheel 12 about the axis of the shaft 19 in a clockwise direction, thereby increasing the effective spacing between the pulley wheel 12 and the driven pulley (not shown) with the result that the tension in the belt 11 is increased in correspondence with the increase in the contemporary magnitude of the applied load.

Any decrease in the contemporary value of the applied load will cause the pulley wheel 12 to be displaced angularly in the opposite direction about the axis or rotation of the shaft 19 because any such decrease in load will tend to apply a positive acceleration to the belt along the lower reach thereof thereby attempting to permit the pulley wheel to rotate more freely, whereupon it is displaced in a counterclockwise direction about the axis of the shaft 19 to a position corresponding to the diminution in the magnitude of the applied load. The same results pertain in the case in which the power shaft 19 is the driven or load-bearing shaft.

Accordingly, the mechanism 10 functions to adjust the tension in the belt 11 automatically in accordance with the magnitude of the contemporary value of the requirement for power transmission along the belt 11, increasing the tension when the requirement for power transmission increases and vice versa. The rollers 15 provide the dual function of supporting the pulley wheel 12 for rotation about its center and at the same time serving as the teeth of an internal ring gear cooperatively engaged by a spur gear meshingly related thereto.

While in the foregoing specification an embodiment of the invention has been set forth in considerable detail for purposes of making a complete disclosure thereof, it will be apparent to those skilled in the art the numerous changes may be made in such details without departing from the spirit and principles of the invention. part

What is claimed is:

1. Tension-adjusting mechanism for an endless power-transmitting belt or the like, comprising an annular pulley wheel adapted to have such belt entrained thereabout and having an open interior provided therealong with a plurality of angularly spaced rollers defining the teeth of an internal ring gear, a power shaft disposed transversely relative to said pulley wheel and being equipped with a gear meshingly engaging said ring gear, support structure disposed at least in part within the interior of said pulley wheel and in engagement with said rollers therein to support said pulley wheel for rotation about a center established by said support structure whereby said rollers function both as gear teeth and as rotatable supports, and hanger structure connected with said support structure and being mounted for angular displacements about a center substantially coincident with the axis of rotation of said shaft so that the center of rotation of said pulley wheel can be angularly displaced about the axis of said shaft to adjust the tension of any such belt entrained about said pulley wheel in accordance with the requirement for power transmission through the belt.

2. The mechanism of claim 1 in which said support structure comprises a plurality of individual segments to facilitate positioning thereof within said pulley wheel.

3. The mechanism of claim 2 in which said hanger structure is supported by said shaft for angular displacement thereabout.

4. The mechanism of claim 2 in which each of said rollers is rotatably supported by said drive pulley.

5. The mechanism of claim 4 in which said hanger structure is located exteriorly of said pulley wheel.

6. The mechanism of claim 1 in which said support structure comprises a plurality of individual segments to facilitate positioning thereof within said pulley wheel, and in which said hanger structure is located exteriorly of said pulley wheel.

7. The mechanism of claim 6 in which said hanger structure is supported by said shaft for angular displacement thereabout, and in which each of said rollers is rotatably supported by said drive pulley.

8. The mechanism of claim 7 in which said hanger structure includes a plate located exteriorly of said drive pulley, and further includes fastener means extending between each of said support segments and said plate.

9. The mechanism of claim 8 in which an additional plate provided by said hanger structure is located along the opposite side of said pulley wheel exteriorly thereof and is connected with each of said support segments by the aforesaid fastener means.

10. In combination, an annular gear wheel having an open interior provided therealong with a plurality of angularly spaced rollers defining the teeth of an internal ring gear, a power shaft disposed transversely relative to said wheel and being equipped with a gear meshingly engaging said ring gear, support structure in engagement with said rollers to support said wheel for rotation about a center established by said support structure, and hanger structure connected with said support structure and being mounted for angular displacements about a center substantially coincident with the axis of rotation of said shaft so that the center of rotation of said wheel can be angularly displaced about the axis of said shaft in accordance with changes in the requirement for power transmission through said wheel, the diameter of said internal ring gear being substantially greater than the diameter of said gear meshingly engaging the same so that said wheel rotates at a lower angular velocity than that of said gear in meshing engagement with said ring gear.